United States Patent [19]

Holmgren et al.

[11] Patent Number: 4,821,143

[45] Date of Patent: Apr. 11, 1989

[54] SWITCHGEAR ENCLOSURE WITH IMPROVED SUPPORTING FRAME AND IMPROVED ACCESS DOOR

[75] Inventors: Nils V. Holmgren, Greendale; Donald R. Martin; Hinhsomchay Phouybanhdyt, both of Waukesha, all of Wis.

[73] Assignee: Cooper Power Systems, Inc., Houston, Tex.

[21] Appl. No.: 115,537

[22] Filed: Oct. 30, 1987

[51] Int. Cl.⁴ .............................................. H02B 1/04
[52] U.S. Cl. ................................ 361/335; 200/148 B; 361/334; 361/390; 361/429
[58] Field of Search ............................. 307/113, 147; 200/50 AA, 148 R, 148 B, 148 F, 148 D; 361/333, 334, 335, 340, 341, 344, 356, 357, 390, 391, 429

[56] References Cited

U.S. PATENT DOCUMENTS

| | | |
|---|---|---|
| 1,878,999 | 9/1932 | Ainsworth . |
| 2,077,160 | 4/1937 | Wilson, Jr. ...................... 361/390 |
| 2,080,226 | 5/1937 | Paxton ........................... 175/298 |
| 2,185,562 | 1/1940 | Nielsen ........................... 361/391 |
| 2,362,304 | 11/1944 | Reed et al. ..................... 175/307 |
| 2,424,345 | 7/1947 | West ............................... 175/298 |
| 3,215,897 | 11/1965 | Hertig et al. .................... 317/103 |
| 3,405,325 | 10/1968 | Bruckner et al. ................ 317/103 |
| 3,858,091 | 12/1974 | Wilkenson ....................... 361/390 |
| 4,076,353 | 2/1978 | Barlow ............................ 361/390 |
| 4,209,821 | 6/1980 | Kobayashi ....................... 361/341 |
| 4,241,379 | 12/1980 | Olsen .............................. 361/341 |
| 4,262,323 | 4/1981 | Yoshida .......................... 361/333 |
| 4,500,935 | 2/1985 | Tsuruta et al. .................. 361/333 |
| 4,570,042 | 2/1986 | Yanabu ........................ 200/148 B |
| 4,570,202 | 2/1986 | Nishida et al. ................. 361/333 |
| 4,677,524 | 6/1987 | Shiraishi et al. ................ 361/335 |
| 4,688,143 | 8/1987 | Beard ............................. 361/335 |
| 4,689,716 | 8/1987 | Cooper et al. .................. 361/331 |

Primary Examiner—Gerald P. Tolin
Attorney, Agent, or Firm—Nelson A. Blish; Eddie E. Scott; Alan Thiele

[57] ABSTRACT

A switchgear apparatus comprising a row of pressure vessels, a frame including first and second generally horizontal, elongated members rigidified by the row of pressure vessels, an outer housing including a generally horizontal top portion supported by the frame, generally vertical, spaced apart side portions connected to the top portion, and a door which is movable between a lowered, closed position in which the door prevents access to the interior of the housing and a raised, open position in which the door affords access to the interior of the housing, the door including a generally planar first portion connected to the top portion for pivotal movement relative thereto about a generally horizontal axis, the first portion being angularly spaced from the top portion when the door is in the raised position, a mechanism for assisting manual movement of the door from the lowered position to the raised position, and a mechanism for releasably retaining the door in the raised position.

13 Claims, 3 Drawing Sheets

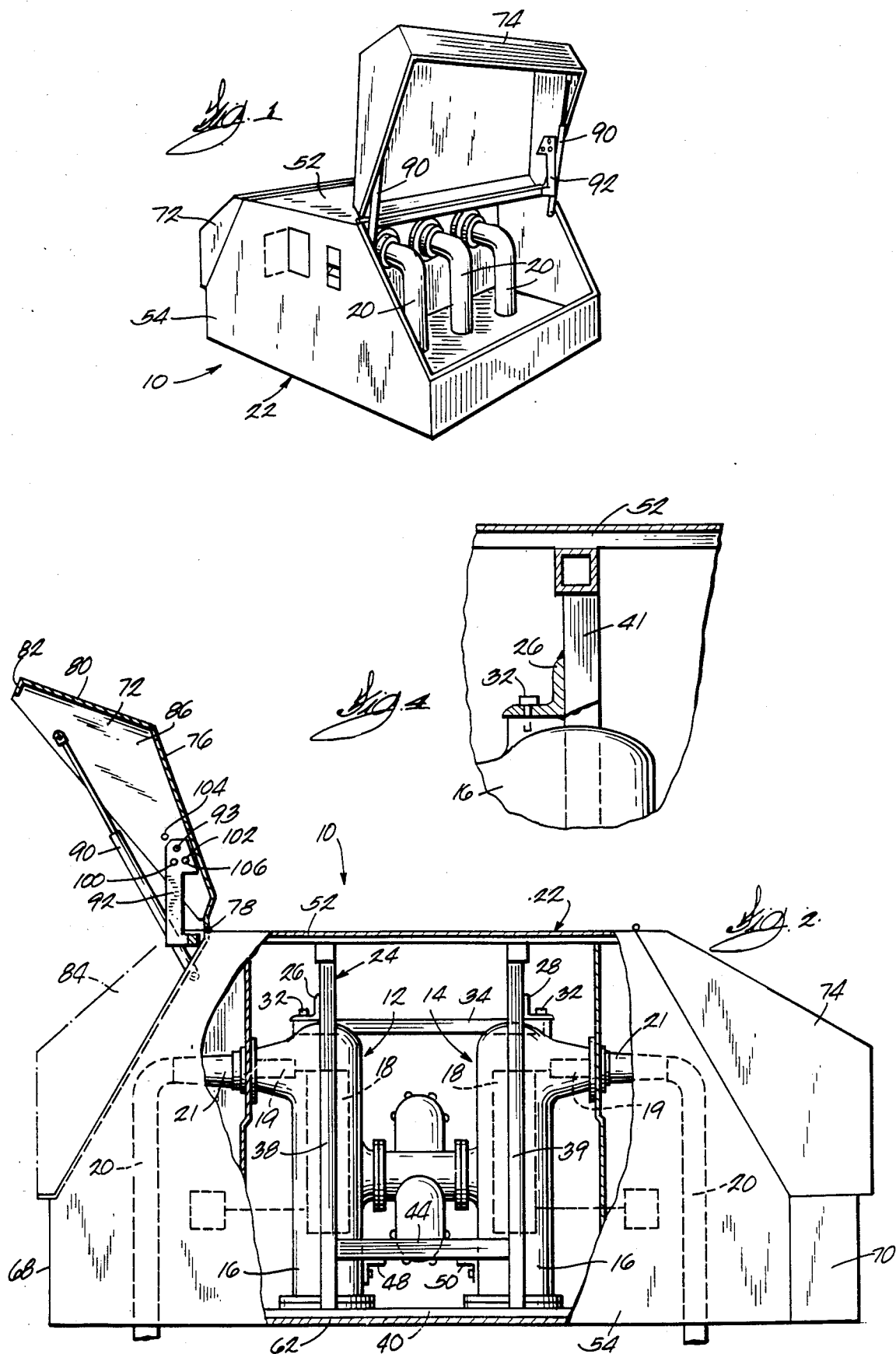

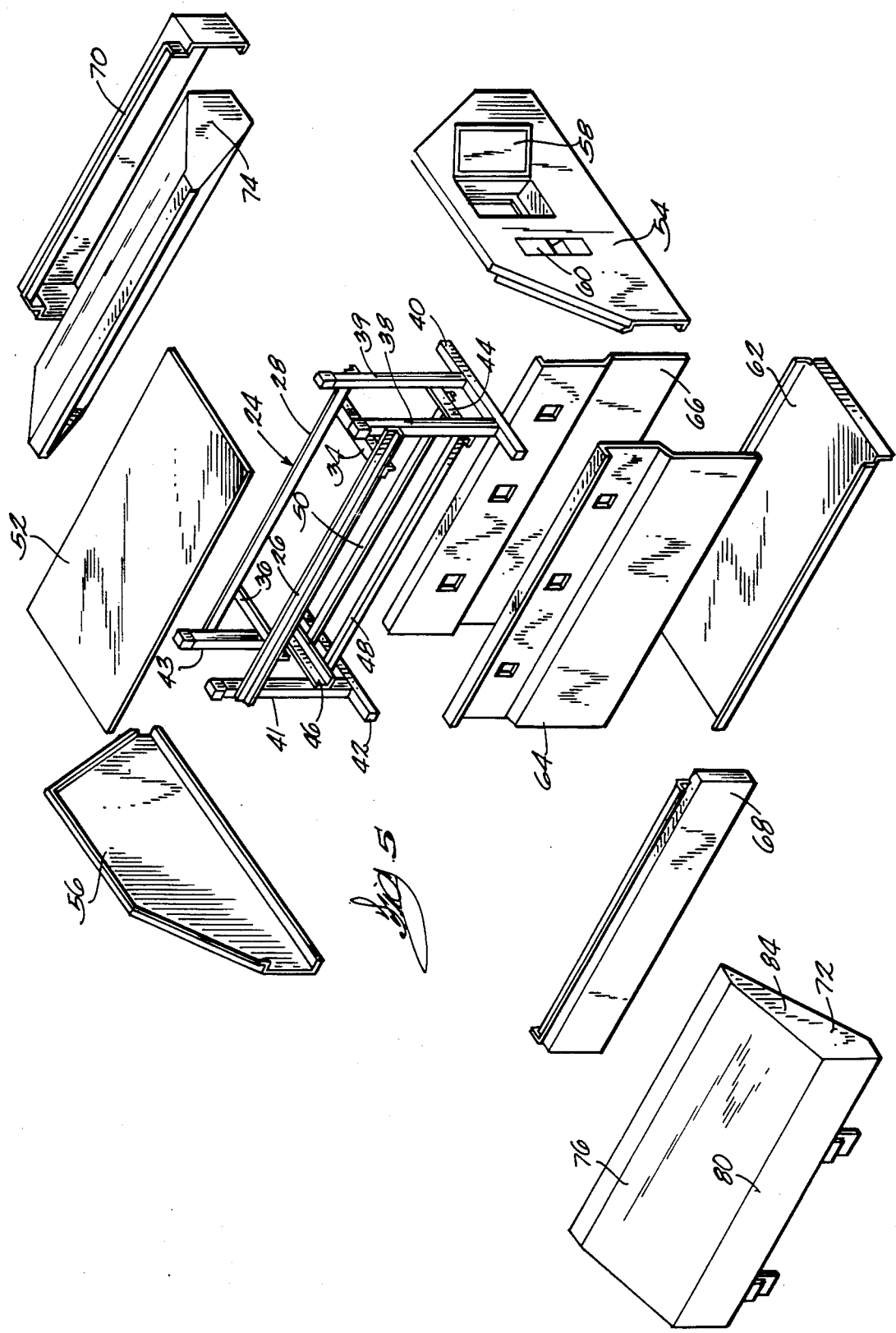

SWITCHGEAR ENCLOSURE WITH IMPROVED SUPPORTING FRAME AND IMPROVED ACCESS DOOR

BACKGROUND OF THE INVENTION

Padmount switchgear is typically enclosed in order to provide protection for and prevent contact with the internal components. A common construction comprises a housing which encloses the switchgear and which includes an outer skin supported by a frame structure separate from the enclosed switchgear.

Typically, the housing includes a generally horizontal, stationary top portion, and a door connected to the top portion for pivotal movement about a horizontal axis. The door is opened by swinging it upwardly and resting it on the top portion of the housing. This presents a problem in snowy climates because the top portion of the housing must be cleared of snow to insure that the door can be fully opened. Also, the door usually does not provide any overhead protection from the elements when it is in the open position.

Because of its weight, the door is commonly split or made into halves to allow it to be opened by a single person. This creates manufacturing and tamperproofing difficulties.

SUMMARY OF THE INVENTION

The invention provides a switchgear enclosure wherein switchgear pressure vessels are an integral part of the supporting structure for the outer skin. This arrangement permits the construction of a lighter overall assembly. The enclosure also includes doors that do not swing all the way upwardly to rest on the top Portion of the enclosure, but that are retained in an open position wherein the doors are angularly spaced from the top portion of the enclosure and provide overhead protection from the elements.

More specifically, the invention provides a switchgear apparatus comprising a row of pressure vessels, and a frame including a pair of vertically spaced apart, horizontal members connected to and rigidified by the row of pressure vessels. In the preferred embodiment, one of the horizontal members is fixedly connected to the tops of the pressure vessels, and the other horizontal member is fixedly connected to the pressure vessels at points below the tops thereof. The apparatus also comprises an outer housing or skin including a generally horizontal top portion supported by the frame, and vertical side portions connected to the top portion. Because the pressure vessels are used to rigidify the frame, the outer housing can be constructed as a separate unit and can be constructed of a plurality of substantially flat sheets. This results in minimal space requirements for inventory.

The housing also includes a door which is movable between a lowered, closed position in which the door prevents access to the interior of the housing, and a raised, open position in which the door affords access to the interior of the housing. The door includes a planar portion connected to the top portion for pivotal movement relative thereto about a generally horizontal axis. The planar portion is angularly spaced from the top portion when the door is in the raised position, so that it is not necessary to remove snow from the top portion in order to fully open the door. Also, the door extends above at least part of the exposed portion of the housing when the door is in the open position, so that the door provides overhead protection from the elements when it is in the open position.

The apparatus also comprises a gas spring mechanism for assisting manual movement of the door to its raised position, and a latch mechanism for releasably retaining the door in its raised position. The gas spring mechanism permits the door to have a unitary construction.

Other features and advantages of the invention will become apparent to those skilled in the art upon review of the following detailed description, claims and drawings.

DESCRIPTION OF THE DRAWINGS

FIG. 1 is a perspective view of a switchgear apparatus embodying the invention and including pressure vessels, an outer housing and a supporting frame.

FIG. 2 is a side elevational view of the apparatus.

FIG. 4 is an enlarged view taken along line 4—4 in FIG. 3.

FIG. 5 is an exploded view of the outer housing and supporting frame.

Figure 3:
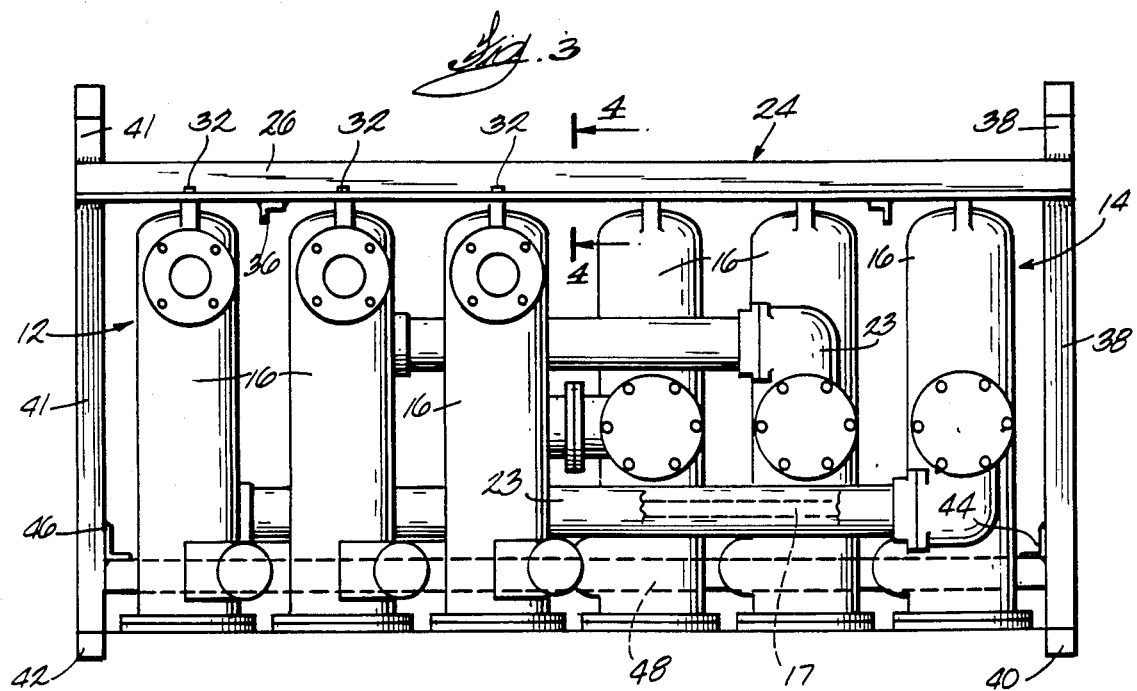
FIG. 3 is an elevational view of the pressure vessels and supporting frame.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A switchgear apparatus 10 embodying the invention is illustrated in the drawings. As shown in FIGS. 2 and 3, the apparatus 10 comprises two generally parallel rows 12 and 14 of identical Pressure vessels 16, with each row including three pressure vessels 16. Each pressure vessel 16 contains a dielectric fluid, such as sulfur hexafluoride ($SF_6$), held under pressure, a switch mechanism 18 (shown schematically), and a conductor 19 connected through a bushing 21 to a respective power line 20, as is known in the art. It should be understood that in the present application the term "switch mechanism" includes both a switch and an interrupter. A Preferred arrangement is disclosed in U.S. patent application Ser. No. 115,529 titled "Suicide Switch/Interrupter with Variable Volume Chamber and Puffer Action," which was filed concurrently herewith and which is incorporated by reference. The pressure vessels 16 are interconnected by suitable ducts 23 containing means 17 (shown schematically) for electrically connecting the switch mechanisms 18 or conductors 19. Preferably, the means 17 includes conductors or bus bars.

The apparatus 10 also comprises an outer housing 22, which will be described in detail hereinafter, and means including the pressure vessels 16 for supporting the outer housing 22. While various suitable means can be employed, in the preferred embodiment, such means includes a frame 24 which supports the outer housing 22 and which is rigidified by the pressure vessels 16. As shown in FIGS. 2-5, the frame 24 includes a pair of spaced apart, generally horizontal elongated members 26 and 28 respectively connected to the first and second rows 12 and 14 of pressure vessels 16. More particularly, each of the members 26 and 28 is connected to the top of the associated pressure vessels 16 by suitable means such as bolts 32. This arrangement is best shown in FIG. 4. Preferably, the elongated members 26 and 28 are made of angle iron.

The frame 24 also includes a pair of brace members 34 and 36 extending between the elongated members 26 and 28 adjacent the opposite ends thereof, and four generally vertical support members 38, 39, 41 and 43 supporting the four ends of the elongated members 26 and 28. The vertical support members 38, 39, 41 and 43 are located on the opposite ends of the pressure vessels 16. The support members 38 and 39 are mounted on a horizontal base member 40, and the support members 41 and 43 are mounted on a horizontal base member 42. The frame 24 further includes a brace member 44 extending between the support members 38 and 39, a brace member 46 extending between the support members 41 and 43, and a pair of generally horizontal, parallel brace members 48 and 50 extending between the brace members 44 and 46. As shown in FIG. 2, the brace members 48 and 50 extend between the two rows of pressure vessels 16. The brace member 48 is fixedly connected to the row 12 of pressure vessels 16, and the brace member 50 is fixedly connected to the row 14 of pressure vessels 16. Accordingly, each of the pressure vessels 16 is connected to one of the members 26 and 28 at a first point, and each is connected to one of the members 48 and 50 at a second point spaced from the first point.

The housing or outer skin 22 includes a plurality of substantially flat panels and a pair of doors. More particularly, the housing 22 includes a generally horizontal, stationary top portion or panel 52 supported by the upper ends of the members 38, 39, 41 and 43, and a pair of generally vertical side portions or panels 54 and 56 connected to the top portion 52. The side panel 54 includes a door 58 for providing access to the electronic controls (not shown) for the switchgear, and a door 60 for providing access to an operating mechanism (not shown) for the switchgear.

The housing 22 also includes a generally horizontal, rectangular base portion or panel 62 which extends between the side portions 54 and 56 and on which the pressure vessels 16 are mounted, and a pair of generally vertical partitions 64 and 66 extending upwardly from the opposite sides of the base portion 62 and extending between the side portions 54 and 56. The partitions 64 and 66 separate the pressure vessels 16 from the power lines 20, as shown in FIG. 2. The housing 22 also includes a pair of sills 68 and 70 extending between the side portions 54 and 56 on opposite sides thereof, and a pair of doors 72 and 74. The doors 72 and 74 are substantially identical in structure and function, and only the door 72 will be described in detail.

The door 72 is movable between a lowered, closed position (shown in dotted lines in FIG. 2) wherein the door 72 prevents access to the interior of the housing 22 and a raised, open position (shown in solid lines in FIG. 2) wherein the door 72 affords access to the interior of the housing 22. The door 72 includes a generally planar first portion 76 which is connected to the top portion 52 for pivotal movement relative thereto about a generally horizontal axis 78. The door 72 also includes an integral, generally planar portion 80 which extends generally vertically and upwardly from the sill 68 when the door 72 is in the closed position, and which has a generally linear lower edge 82 extending generally parallel to the axis 78. The door 72 further includes generally vertical end portions 84 and 86 integrally connected to the portions 76 and 80.

As shown in FIG. 2, the first portion 76 of the door 72 is angularly spaced from the top portion 52 of the housing 22 when the door 72 is in the open position. Also, the door 72 extends above at least part of the exposed or accessible portion of the interior of the housing when the door 72 is in the open position.

The apparatus 10 further comprises means for assisting manual movement of the door 72 from the lowered position to the raised position. While various suitable assisting means can be employed, in the preferred embodiment, such means includes a pair of gas spring mechanisms 90 connected between the side portions 54 and 56 of the housing 22 and the door 72. The apparatus 10 also comprises means for releasably retaining the door 72 in the raised position. While various suitable retaining means can be used, in the preferred embodiment, such means includes a support member 92. The member 92 is pivotally movable about an axis 93 between a retracted position (not shown) and an extended position. When the member 92 is in the extended position and the door 72 is in the open position, the outer or lower end of the member 92 engages the side portion 56 of the housing 22 so that the member 92 retains the door 72 in the raised or open position. In the preferred embodiment, means is provided for releasably locking the member 92 in either the retracted position or the extended position. While various suitable locking means can be used, in the illustrated construction, such means includes, in the member 92, a pair of apertures 100 and 102 spaced from the axis 93 and, on the door 72, a pair of locking pins 104 and 106. The pin 104 is selectively extendable into the aperture 100 when the member 92 is in the retracted position, and the pin 106 is selectively extendable into the aperture 102 when the member 92 is in the extended position. Preferably, the locking pins 104 and 106 are axially biased in a direction so that each locking pin will automatically extend into its respective aperture when aligned therewith.

It should be understood that in alternative embodiments the retaining means could simply include the gas spring mechanisms 90 or whatever other assisting means is employed.

The apparatus 10 also comprises means for preventing movement of the door 72 beyond the raised position. While various suitable means can be used, in the preferred embodiment, this means includes a cable (not shown) extending between the door 72 and the housing 22.

FIGS. 6-9 illustrate various possible electrical circuits that can be provided by the switchgear apparatus 10. Switches and interrupters are shown schematically in FIGS. 6-9, and each figure illustrates a single phase of a three-phase system. Accordingly, each of the figures shows only ⅓ of the total number of switches and/or interrupters. While only six pressure vessels 16 are illustrated in the drawings, the housing 22 has space for a total of twelve pressure vessels, which is the number of pressure vessels required by the circuits illustrated in FIGS. 6 and 7.

Figure 6:
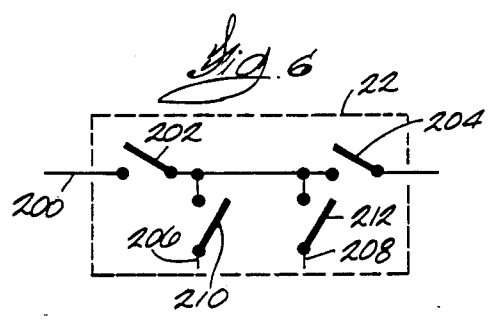
FIGS. 6-9 are partial schematic views of various possible electrical circuits provided by the switchgear apparatus.
Figure 7:
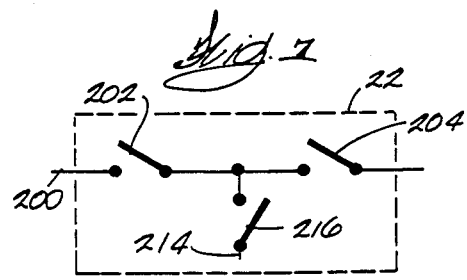
Figure 8:
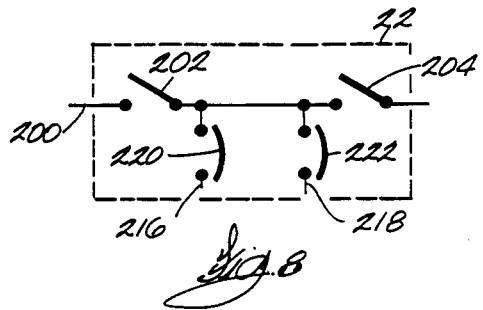
Figure 9:
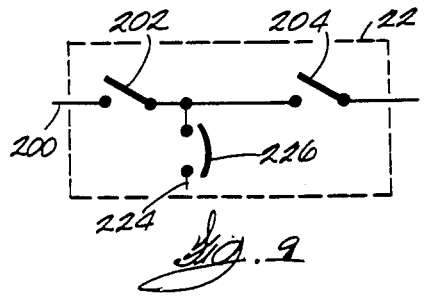

Each of FIGS. 6-9 illustrates the housing 22 (shown schematically), a feeder line 200, and switches 202 and 204 connected in series in the feeder line 200. Illustrated in FIG. 6 are tap lines 206 and 208 connected to the feeder line 200 between the switches 202 and 204 and having therein respective switches 210 and 212. Illustrated in FIG. 7 is a single tap line 214 connected to the feeder line 200 between the switches 202 and 204 and having therein a switch 216. Illustrated in FIG. 8 are tap lines 218 and 220 connected to the feeder line 200 between the switches 202 and 204 and having therein respective interrupters 222 and 224. Illustrated in FIG. 9 is a single tap line 226 connected to the feeder line 200 between the switches 202 and 204 and having therein an interrupter 226. Other arrangements are possible.

Various features of the invention are set forth in the following claims.

We claim:

1. A switchgear apparatus comprising
   a switch mechanism,
   a conductor electrically connected to said mechanism,
   a pressure vessel enclosing said mechanism and said conductor in a dielectric fluid,
   an outer housing enclosing said pressure vessel, and
   a frame which is adapted to be supported by the ground, which directly supports at least a portion of said outer housing above the ground, and which is rigidified by said pressure vessel by being attached thereto.

2. An apparatus as set forth in claim 1 wherein said frame includes a generally horizontal, elongated first member, and a generally horizontal, elongated second member, wherein said apparatus further comprises a second switch mechanism, and a second pressure vessel enclosing said second switch mechanism, and wherein said first-mentioned pressure vessel and said second pressure vessel both extend between and are fixed to said elongated members.

3. An apparatus as set forth in claim 2 wherein said frame further includes first and second vertical members which are adapted to be supported by the ground, which support said first and second horizontal members above the ground, and which supports said outer housing above the ground.

4. An apparatus as set forth in claim 1 wherein said frame includes first, second, third and fourth generally vertical members which are adapted to be supported by the ground and which have respective upper ends supporting said outer housing above the ground, first and second vertically spaced apart, generally horizontal members extending between and supported above the ground by said first and second vertical members, and third and fourth vertically spaced apart, generally horizontal members extending between and supported above the ground by said third and fourth vertical members, wherein said pressure vessel extends between and is fixed to said first and second horizontal members, and wherein said apparatus further comprises a second switch mechanism, and a second pressure vessel which encloses said second switch mechanism and which extends between and is fixed to said third and fourth horizontal members.

5. An apparatus as set forth in claim 1 wherein said outer housing includes an interior and a door which is movable between a lowered, closed position in which said door prevents access to said interior of said housing and a raised, open position in which said door affords access to said interior of said housing, and wherein said apparatus further comprises means for assisting manual movement of said door from said lowered position to said raised position, and means for releasably retaining said door in said raised position.

6. An apparatus as set forth in claim 5 wherein said housing includes a generally horizontal, stationary top portion, and wherein said door includes a first portion which is connected to said top portion for pivotal movement about a generally horizontal axis, and wherein said first portion is angularly spaced from said top portion when said door is in said raised position.

7. An apparatus as set forth in claim 5 wherein said housing includes an interior portion which is accessible when said door is in said open position, and wherein said door extends above at least part of said interior portion when said door is in said raised position.

8. An apparatus as set forth in claim 5 wherein said assisting means includes a gas spring mechanism.

9. A switchgear apparatus comprising
   a sealed fluid pressure vessel,
   a switch mechanism having relatively moveable contacts enclosed by said pressure vessel,
   a frame including a generally horizontal, elongated first member fixedly connected to said pressure vessel at a first point, and a generally horizontal, elongated second member fixedly connected to said pressure vessel at a second point spaced from said first point,
   an outer housing enclosing said pressure vessel and including an interior, a generally horizontal top portion supported by said frame, generally vertical, spaced apart side portions connected to said top portion, and a door which is movable between a lowered, closed position in which said door prevents access to said interior and a raised, open position in which said door affords access to said interior, said door including a first portion connected to said top portion for pivotal movement relative thereto about a generally horizontal axis, said first portion being angularly spaced from said top portion when said door is in said raised position,
   means for assisting manual movement of said door from said lowered position to said raised position, and
   means for releasably retaining said door in said raised position.

10. An apparatus as set forth in claim 9 wherein said interior includes a portion which is accessible when said door is in said open position, and wherein said door extends above at least part of said interior portion when said door is in said open position.

11. An apparatus as set forth in claim 9 wherein said assisting means includes a gas spring mechanism.

12. An outdoor switchgear apparatus comprising a sealed fluid pressure vessel,
    a switch mechanism having relatively movable contacts enclosed by said pressure vessel,
    an outer housing enclosing said switch mechanism and including an interior, a generally horizontal, stationary top Portion, generally vertical, spaced apart side portions connected to said top portion, and a door which is movable between a lowered, closed position in which said door prevents access to said interior of said housing, and a raised, open position in which said door affords access to a portion of said interior of said housing, said door including a generally planar first portion directly connected to said top portion for pivotal movement relative thereto about a generally horizontal axis, said first portion being angularly spaced from said top portion when said door is in said raised position, and said door extending above at least part of said interior portion when said door is in said raised position, means connected between said housing and said door for exerting a force on said door to assist manual movement of said door from said lowered position to said raised position, and means for releasably retaining said door in said raised position.

13. An apparatus as set forth in claim 12 wherein said assisting means includes a gas spring mechanism.

* * * * *